US010812788B1

(12) United States Patent
Mishra et al.

(10) Patent No.: US 10,812,788 B1
(45) Date of Patent: Oct. 20, 2020

(54) SYSTEMS AND METHODS TO CALIBRATE SPECTRAL CHARACTERISTICS OF IMAGING SENSORS

(71) Applicant: Amazon Technologies, Inc., Seattle, WA (US)

(72) Inventors: Pragyana K. Mishra, Seattle, WA (US); Gur Kimchi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/436,509

(22) Filed: Jun. 10, 2019

(51) Int. Cl.
*H04N 7/18* (2006.01)
*H04N 17/00* (2006.01)
*G06T 7/80* (2017.01)
*G01J 3/28* (2006.01)
*G01N 15/06* (2006.01)
*H04N 5/235* (2006.01)

(52) U.S. Cl.
CPC .......... *H04N 17/002* (2013.01); *G01J 3/2823* (2013.01); *G01N 15/06* (2013.01); *G06T 7/80* (2017.01); *H04N 5/2351* (2013.01)

(58) Field of Classification Search
CPC ............ B64C 39/024; B64C 2201/127; B64C 2201/128; B64C 5/60; G06T 7/80; G06T 7/74; H04N 13/246

USPC .................................................. 348/142–160
See application file for complete search history.

(56) References Cited

U.S. PATENT DOCUMENTS

| 9,424,735 B2* | 8/2016 | Haidegger | G08B 21/245 |
| 10,214,286 B2* | 2/2019 | Kobata | B64C 39/024 |
| 2008/0095212 A1* | 4/2008 | Jonnalagadda | G01J 5/0003 374/124 |
| 2015/0346029 A1* | 12/2015 | Kim | G01J 3/28 250/252.1 |
| 2017/0221394 A1* | 8/2017 | Garcia Morchon | G03B 21/608 |
| 2020/0007384 A1* | 1/2020 | Mueck | H04L 41/0659 |
| 2020/0184236 A1* | 6/2020 | Aguiar | G05D 1/0088 |

* cited by examiner

*Primary Examiner* — Fabio S Lima
(74) *Attorney, Agent, or Firm* — Athorus, PLLC

(57) ABSTRACT

Systems and methods to calibrate an imaging sensor may include an enclosure with a controlled environment, a light source illuminating the environment, and a particle source emitting desired particles at desired concentrations into the environment. An imaging sensor, which may be associated with an aerial vehicle, may be placed within the enclosure, and the imaging sensor may capture imaging data within the controlled environment. In addition, the imaging data may be processed to determine current spectral characteristics of the imaging sensor. Based on the environment, light, and particle properties within the environment, the imaging sensor may be calibrated to exhibit nominal or desired spectral characteristics.

20 Claims, 8 Drawing Sheets

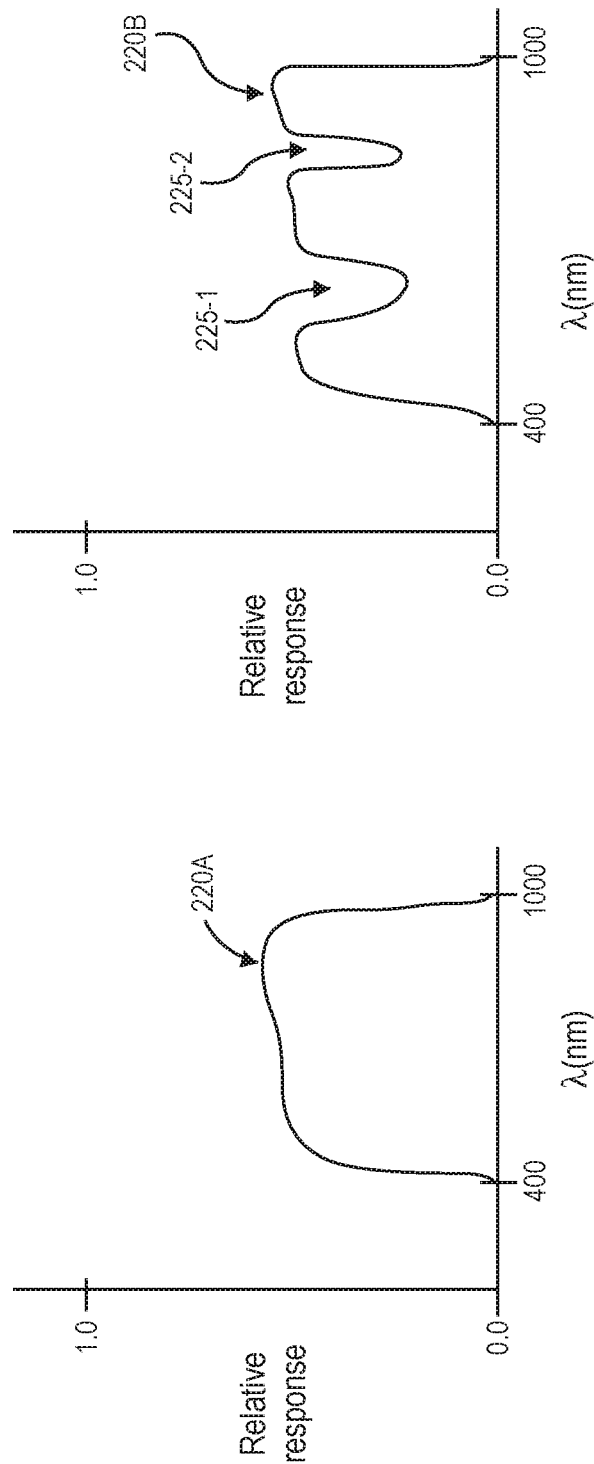

SYSTEMS AND METHODS TO CALIBRATE SPECTRAL CHARACTERISTICS OF IMAGING SENSORS

BACKGROUND

Unmanned vehicles, such as unmanned aerial vehicles, automated ground vehicles, and water based automated vehicles, are continuing to increase in use. For example, aerial vehicles are often used by hobbyists to obtain aerial images of buildings, landscapes, etc. While there are many beneficial uses of these vehicles, operating and navigating aerial vehicles safely and efficiently within various environments may be challenging. To maintain safety, various object detection and avoidance systems and methods may be incorporated into aerial vehicles, such as imaging systems, radar systems, or others. However, calibration of sensor systems, such as imaging systems, may change or drift over time, such that data associated with such sensor systems may become inaccurate and unreliable. Accordingly, there is a need for improved systems and methods for calibration of sensor systems, particularly for calibration of spectral characteristics of imaging systems, to improve and maintain accuracy and reliability of such sensor systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is a schematic graph of an example spectral response curve of an imaging sensor, in accordance with disclosed implementations.

FIG. 2B is a schematic graph of an example spectral response curve of an imaging sensor responsive to injection of absorptive particles, in accordance with disclosed implementations.

Figure 1:
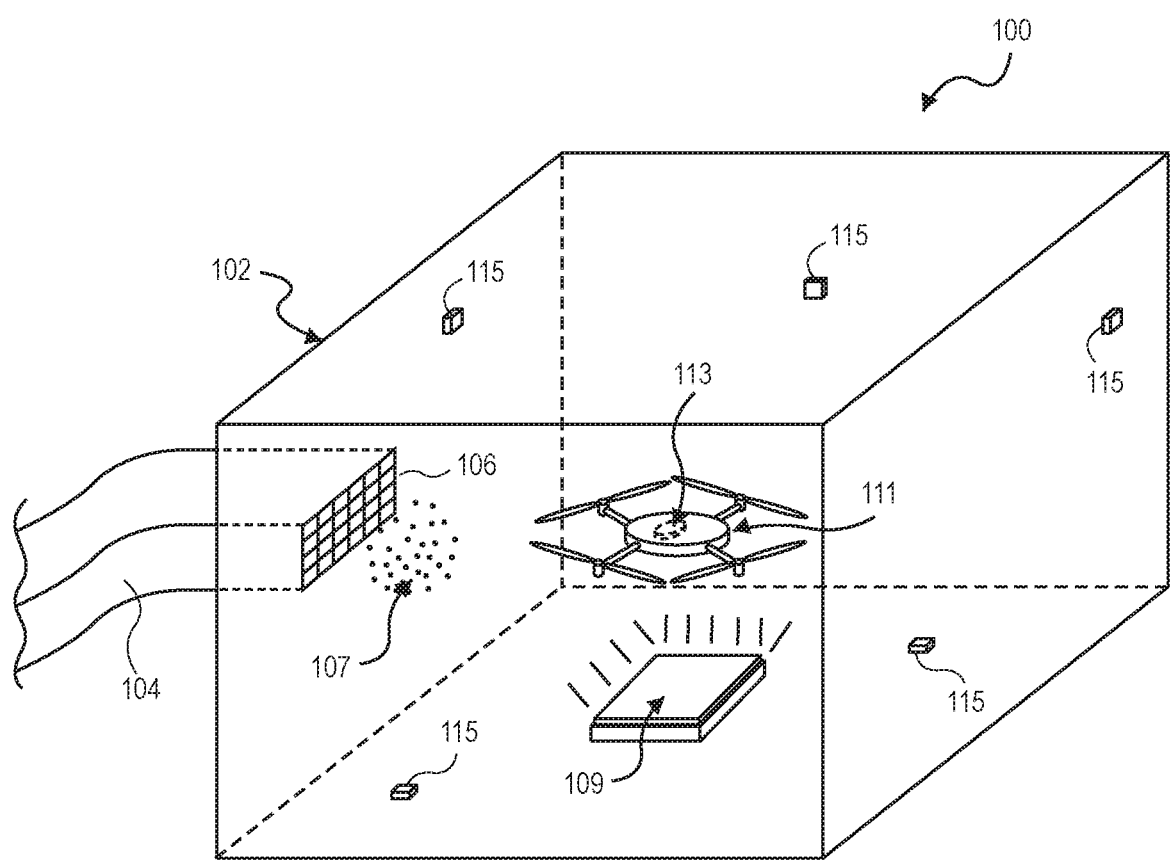
FIG. 1 is a schematic diagram of an example sensor calibration system, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein relate to calibration of spectral characteristics of imaging sensors. In example embodiments, the spectral characteristics of imaging sensors may comprise spectral range, spectral sensitivity, spectral resolution, spectral response curves, and/or other spectral characteristics. Further, the spectral characteristics of imaging sensors may comprise color sensitivity, photon sensitivity, and/or other spectral characteristics. Imaging sensors as described herein may comprise various types of imaging sensors or devices, including but not limited to CCD (charge-coupled device) imaging sensors, CMOS (complementary metal-oxide-semiconductor) imaging sensors, NMOS (N-type metal-oxide-semiconductor) imaging sensors, or other types of imaging sensors.

Generally, an imaging sensor may be calibrated in isolation during or after manufacturing, and/or prior to assembly, installation, and operation in various systems, such as vehicles, machines, equipment, or other systems or devices. However, during operation of an imaging sensor as part of various systems, the calibration of the imaging sensor may change, shift, or drift over time due to various factors. For example, the various factors that may cause movement or drift in calibration of imaging sensors may include motion, vibration, humidity, pressure, sunlight, temperature, precipitation, condensation, airflow, other factors, changes to various factors, and/or combinations of various factors.

Accordingly, the systems and methods to calibrate spectral characteristics of imaging sensors described herein may include a chamber or enclosure that may be a substantially airtight, closed, and controlled environment. The environment within the chamber or enclosure may be controlled with respect to various environment properties, such as pressure, volume, temperature, humidity, airflow, or other properties. In addition, the various environment properties may be changed or modified to simulate different environmental conditions. Further, various types of particles at desired concentrations may be injected into the chamber or enclosure to calibrate the spectral characteristics of imaging sensors. In this regard, the injected particles may comprise various types of elements, molecules, charged particles, and/or materials having known spectral characteristics at known concentrations.

In example embodiments, the chamber or enclosure may be configured to receive an aerial vehicle, or other vehicle, machine, equipment, system, or device, including an imaging sensor to be calibrated for spectral characteristics. The aerial vehicle, or other vehicle, machine, equipment, system, or device, may be placed, supported, suspended, or otherwise held within the chamber or enclosure, e.g., by a platform, frame, supports, cables, tethers, or other structural elements.

Further, the chamber or enclosure may include a light source configured to illuminate the chamber or enclosure, and/or configured to emit or direct light toward the imaging sensor of the aerial vehicle, or other vehicle, machine, equipment, system, or device, placed within the chamber or enclosure. The light source may be configured to emit light having various light properties, such as frequency, wavelength, amplitude, or other properties.

Based on a known, calibrated imaging sensor having nominal spectral characteristics, known environment properties within the chamber or enclosure, known light properties within the chamber or enclosure, and/or known particle properties and concentrations within the chamber or enclosure, imaging data captured by the calibrated imaging sensor may be processed and analyzed to determine nominal spectral characteristics of the calibrated imaging sensor. By adjusting or modifying the various environment properties, light properties, and/or particle properties, nominal spectral characteristics of the calibrated imaging sensor may be processed, determined, and/or stored for various environments and associated conditions with respect to the known, calibrated imaging sensor. In this manner, nominal spectral characteristics for various types of calibrated imaging sensors may be processed, determined, and/or stored with respect to various known environment properties, light properties, and/or particle properties.

Then, an uncalibrated imaging sensor may be placed within the chamber or enclosure with known environment properties within the chamber or enclosure, known light properties within the chamber or enclosure, and/or known particle properties and concentrations within the chamber or enclosure, and imaging data captured by the uncalibrated imaging sensor may be processed and analyzed to determine current spectral characteristics of the uncalibrated imaging sensor. Based on the known nominal spectral characteristics of a calibrated imaging sensor of the same type as the uncalibrated imaging sensor, the uncalibrated imaging sensor may then be calibrated to exhibit the nominal spectral characteristics.

In further example embodiments, rather than calibrating an uncalibrated imaging sensor to exhibit the nominal spectral characteristics, the uncalibrated imaging sensor may instead be calibrated to various desired spectral characteristics based on known or expected environment properties, light properties, and/or particle properties to be encountered during operation of the imaging sensor. For example, although the desired spectral characteristics of the imaging sensor may technically be off-nominal spectral characteristics, the desired spectral characteristics may enable capture of imaging data by the imaging sensor within the particular known or expected environment and associated conditions that may be processed and utilized during operation of the imaging sensor.

In additional example embodiments, based on various combinations of known environment properties, known light properties, known particle properties, and/or known calibrations of imaging sensors, an imaging sensor may be selected from a plurality of types of imaging sensors of a vehicle or other system that may be best suited for the known or expected environment and associated conditions during operation of the imaging sensor. Further, various environment properties, light properties, and/or particle properties may be determined based on measured or current spectral characteristics of known, calibrated imaging sensors operating within such environments and associated conditions.

FIG. 1 is a schematic diagram 100 of an example sensor calibration system, in accordance with disclosed implementations.

The example sensor calibration system may include a chamber or enclosure 102. The chamber or enclosure may enclose a particular volume, e.g., large enough to accommodate or enclose an aerial vehicle, or other vehicle, machine, equipment, system, or device, having an imaging sensor to be calibrated. The enclosure 102 may be made of various materials, such as glass, metals, wood, plastics, composites, other materials, or combinations thereof. For example, the enclosure 102 may be a substantially airtight, closed, and controlled environment, and various environment properties within the enclosure 102 may be measured and/or controlled, such as pressure, volume, temperature, humidity, airflow, or other properties. In addition, various types of sensors 115, such as barometers, thermometers, hygrometers, airflow sensors, or other types of sensors, may be used to measure the various environment properties within the enclosure 102. Although FIG. 1 illustrates a substantially rectangular prism shape and particular size of the enclosure 102, the chamber or enclosure may be formed in various other shapes or sizes to accommodate or enclose various systems having imaging sensors, or various imaging sensors individually, to be calibrated. In addition, the various types of sensors 115 described herein may be positioned or located at various different locations within the enclosure 102, including at locations associated with portions of the channel 104 or opening 106, portions of the light source 109, and/or portions of the aerial vehicle 111 or imaging sensor 113.

In addition, the chamber or enclosure 102 may comprise a duct, pipe, or channel 104 coupled to a particle source. The channel 104 may be opened or closed as desired, such as via a valve or opening 106, to inject particles 107 into and/or remove particles 107 from the enclosure 102. In example embodiments, the channel 104 may be coupled to a plurality of particle sources, and various particle sources or combinations thereof may be selected to inject particles 107 into and/or remove particles 107 from the enclosure 102. The particles 107 may comprise various types of particles, such as elements, molecules, charged particles, and/or materials, having known spectral characteristics, and the various types of particles may be injected into or removed from the enclosure 102 at known concentrations. In addition, various types of sensors 115, such as particulate sensors, infrared sensors, laser diffraction sensors, air composition sensors, air quality sensors, or other types of sensors, may be used to measure the various particle properties, such as types and concentrations of particles, within the enclosure 102. Although FIG. 1 illustrates a single channel 104 and opening 106 having a particular size and shape, the chamber or enclosure may include any other number, configuration, arrangement, sizes, and shapes of channels and openings associated with one or more particle sources.

Further, the chamber or enclosure 102 may comprise a light source 109 configured to illuminate the enclosure 102, and/or configured to direct or emit light toward an imaging sensor to be calibrated within the enclosure 102. In some example embodiments, the enclosure 102 may comprise a lighted surface that is within a field of view of an imaging sensor placed within the enclosure 102. The light source 109 may emit light having various light properties, such as frequency, wavelength, amplitude, or other properties. In addition, the light source 109 may emit light having various patterns, sequences, or other variations in properties. Further, various types of sensors 115, such photoelectric sensors, photodetectors, photoresistors, photodiodes, phototransistors, or other types of sensors, may be used to measure the various light properties within the enclosure 102. Although FIG. 1 illustrates a single light source 109 positioned at a base of the enclosure 102, the chamber or enclosure may include any other number, configuration, arrangement, sizes, and shapes of various light sources associated with various portions of the enclosure. For example, the light source 109 may comprise a single point light source, a distributed light source, a plurality of light sources positioned at different locations within the enclosure, and/or various combinations of one or more light sources and/or various mirrors or other reflective or translucent surfaces configured to illuminate portions of the enclosure 102.

In example embodiments, the chamber or enclosure 102 may be configured to receive an aerial vehicle 111, or other vehicle, machine, equipment, system, or device, including at least one imaging sensor 113 to be calibrated. The aerial vehicle 111 may be supported via a platform or table, suspended via cables or tethers, and/or otherwise placed or held within the enclosure 102, e.g., in a substantially stationary position. In some example embodiments, a position of the aerial vehicle 111 within the enclosure 102, e.g., relative to the light source 109 or lighted surface within a field of view of the imaging sensor 113, may be adjustable via a platform, table, cables, tethers, or other structure that can move or reposition the aerial vehicle 111, such that a distance between an imaging sensor 113 and a light source 109 or lighted surface within a field of view may be selectable and adjustable. In addition, the imaging sensor 113 of the aerial vehicle 111 may include various sensor environment properties associated with the aerial vehicle 111, such as pressure, temperature, humidity, airflow, or other properties. In addition, various types of sensors 115, such as barometers, thermometers, hygrometers, airflow sensors, or other types of sensors, may be used to measure the various sensor environment properties associated with the imaging sensor 113. Further, the aerial vehicle 111 may include a control system (not shown), as described in further detail with respect to FIG. 7, that may perform all or a part of the functions, operations, or processes described herein related to calibration of spectral characteristics of imaging sensors. Although FIG. 1 illustrates a particular size, shape, and configuration of aerial vehicle 111, including an imaging sensor 113 at a particular location of the aerial vehicle 111, the chamber or enclosure may be configured to receive any other size, shape, or configuration of aerial vehicle, or other vehicle, machine, equipment, system, or device, including at least one imaging sensor to be calibrated.

Generally, an imaging sensor may be calibrated in isolation during or after manufacturing, and/or prior to assembly, installation, and operation in various systems, such as vehicles, machines, equipment, or other systems or devices. However, during operation of an imaging sensor as part of various systems, the calibration of the imaging sensor may change, shift, or drift over time due to various factors. For example, the various factors that may cause movement or drift in calibration of imaging sensors may include motion, vibration, humidity, pressure, sunlight, temperature, precipitation, condensation, airflow, other factors, changes to various factors, and/or combinations of various factors.

The various spectral characteristics of imaging sensors that may be calibrated may include spectral range, spectral sensitivity, spectral resolution, spectral response curves, color sensitivity, photon sensitivity, and/or other spectral characteristics. For example, spectral range or spectral sensitivity may generally refer to sensitivity of an imaging sensor to detect various wavelengths of light. In example embodiments, various imaging sensors may have spectral ranges associated with wavelengths of light between approximately 400 nm (nanometers) and approximately 1000 nm (nanometers). In other example embodiments, various imaging sensors may have spectral ranges associated with wavelengths of light less than approximately 400 nm and/or greater than approximately 1000 nm. Further, various imaging sensors may have spectral ranges that include one or more spectral bands associated with various different wavelengths of light. In addition, spectral sensitivity may also generally refer to sensitivity of an imaging sensor to detect various aspects of light energy, e.g., color sensitivity, photon sensitivity, or sensitivity to other aspects of light energy.

In addition, spectral resolution of an imaging sensor may generally refer to a number of spectral bands, a width of the spectral bands, and/or a sampling rate or frequency of the spectral bands associated with an imaging sensor. For example, the spectral resolution of an imaging sensor may determine a level of granularity with which various spectral characteristics, such as spectral range, spectral sensitivity, color sensitivity, and/or photon sensitivity, may be detected, sampled, and/or stored with respect to a particular type of imaging sensor.

Further, a spectral response curve of an imaging sensor may comprise a visual or graphical representation of spectral range or spectral sensitivity of the imaging sensor. For example, a spectral response curve may visually or graphically present an absolute light detection response or a relative (or normalized) light detection response per light energy of an imaging sensor with respect to different wavelengths of light. In some example embodiments, various imaging sensors may have substantially continuous spectral response curves with respect to different wavelengths of light. In other example embodiments, various imaging sensors may have discontinuous or discrete spectral response curves with one or more spectral bands associated with different wavelengths of light.

In further example embodiments, in addition to spectral characteristics of imaging sensors, various spectral properties of lenses and/or filters associated with imaging sensors may also be calibrated using the systems and methods described herein. For example, spectral properties of lenses and/or filters may include various optical properties, such as intrinsic optical properties, spectral absorptivity, spectral transmittance, distortion parameters, or other optical properties of lenses, filters, and/or surfaces or other portions thereof. In addition, spectral properties of lenses and/or filters may also include various physical properties, such as curvature, sensitivity, spectral response, or other physical properties of lenses, filters, and/or surfaces or other portions thereof.

In order to calibrate various types of imaging sensors during or between operations, the example sensor calibration systems and methods described herein may be used to determine or generate correlations or mappings between known environment properties, known sensor environment properties, known light properties, known particle properties, and/or known nominal spectral characteristics of calibrated imaging sensors.

In example embodiments, a calibrated imaging sensor having known nominal spectral characteristics can be placed within the enclosure, as shown in FIG. 1, with known environment properties, known light properties, and/or known particle properties. Then, the spectral response of the calibrated imaging sensor may be detected, measured, and/or processed, and the spectral response of the calibrated imaging sensor may then be correlated or mapped to the known environment properties, known light properties, and/or known particle properties. Such measurements and processing with known environment properties, known light properties, and/or known particle properties may be performed with various types of calibrated imaging sensors having known nominal spectral characteristics in order to determine or generate correlations or mappings for various calibrated imaging sensors in association with various known environments and associated conditions.

Based at least in part on such determined or generated correlations or mappings, imaging data captured by an uncalibrated imaging sensor in association with known environment properties, known light properties, and/or known particle properties may then be detected, measured, and/or processed to determine differences between the current spectral characteristics of the uncalibrated imaging sensor and nominal spectral characteristics of a calibrated imaging sensor of the same type. Then, for example, the uncalibrated imaging sensor may be calibrated to exhibit the nominal spectral characteristics based on the previously determined or generated correlations or mappings of known environment properties, known light properties, known particle properties, and/or known nominal spectral characteristics of imaging sensors.

FIG. 2A is a schematic graphical representation of an example spectral response curve 220A of an imaging sensor, in accordance with disclosed implementations.

As described herein, a spectral response curve of an imaging sensor may comprise a visual or graphical representation of spectral range or spectral sensitivity of the imaging sensor. For example, a spectral response curve may visually or graphically present an absolute light detection response or a relative (or normalized) light detection response per light energy of an imaging sensor with respect to different wavelengths of light.

FIG. 2A graphically presents a spectral response curve 220A of an example imaging sensor, in which a wavelength of light (λ) in nm (nanometers) is represented on the x-axis, and a relative response per light energy (normalized to values between 0.0 and 1.0) is represented on the y-axis. In example embodiments, the spectral response curve 220A of FIG. 2A may represent the spectral response of an example, calibrated imaging sensor having nominal spectral characteristics associated with known environment properties and known light properties. As shown in FIG. 2A, the relative response per light energy for the example imaging sensor comprises a substantially continuous light detection response over a spectral range of wavelengths between approximately 400 nm and approximately 1000 nm.

Further, a spectral response curve of an uncalibrated imaging sensor of the same type as the example, calibrated imaging sensor represented by the spectral response curve 220A of FIG. 2A may include one or more differences in relative response per light energy at one or more different wavelengths of light. Then, for example, based on such measured or detected differences, the uncalibrated imaging sensor may be calibrated to exhibit the nominal spectral characteristics of the example, calibrated imaging sensor associated with the known environment properties and known light properties.

FIG. 2B is a schematic graphical representation of an example spectral response curve 220B of an imaging sensor responsive to injection or presence of absorptive particles, in accordance with disclosed implementations.

FIG. 2B graphically presents a spectral response curve 220B of an example imaging sensor, similar to the example imaging sensor associated with the spectral response curve 220A of FIG. 2A, in which a wavelength of light (λ) in nm (nanometers) is represented on the x-axis, and a relative response per light energy (normalized to values between 0.0 and 1.0) is represented on the y-axis. In example embodiments, the spectral response curve 220B of FIG. 2B may represent the spectral response of an example, calibrated imaging sensor having nominal spectral characteristics associated with known environment properties and known light properties, and also in an environment including one or more types of particles at desired concentrations, e.g., known particle properties. As shown in FIG. 2B, the relative response per light energy for the example imaging sensor comprises a discontinuous light detection response over a spectral range, including one or more spectral bands, of wavelengths between approximately 400 nm and approximately 1000 nm.

In example embodiments, the particles and desired concentrations of such particles that may cause changes to the spectral response curve 220B to include discontinuities 225-1, 225-2 may include particles that are configured to absorb one or more wavelengths of light. For example, the particles, or electrons associated with the particles, may absorb particular wavelengths of light, such that the amount of light energy received by the example imaging sensor at the particular wavelengths of light may be reduced in a known or expected manner, based on spectral characteristics and concentrations of the particles.

As shown in FIG. 2B, a plurality of particles of a first type at a first concentration may absorb wavelengths of light corresponding to wavelengths associated with each of the discontinuities 225-1, 225-2. Alternatively, a combination of particles including a first type of particles at a first concentration and a second type of particles at a second concentration may absorb different wavelengths of light, e.g., with the first type of particles absorbing wavelengths associated with discontinuity 225-1 and the second type of particles absorbing wavelengths associated with discontinuity 225-2. The various types of particles, desired concentrations, and/or combinations thereof may be selected to absorb particular wavelengths of light and cause corresponding changes to the spectral response curves of imaging sensors, in order to measure spectral characteristics of the imaging sensors with respect to various particular wavelengths of light of interest.

Further, a spectral response curve of an uncalibrated imaging sensor of the same type as the example, calibrated imaging sensor represented by the spectral response curve 220B of FIG. 2B may include one or more differences in relative response per light energy at one or more different wavelengths of light, including with respect to one or more wavelengths of light associated with expected discontinuities 225. Then, for example, based on such measured or detected differences, the uncalibrated imaging sensor may be calibrated to exhibit the nominal spectral characteristics of the example, calibrated imaging sensor associated with the known environment properties, known light properties, and known particle properties.

Figure 3A:
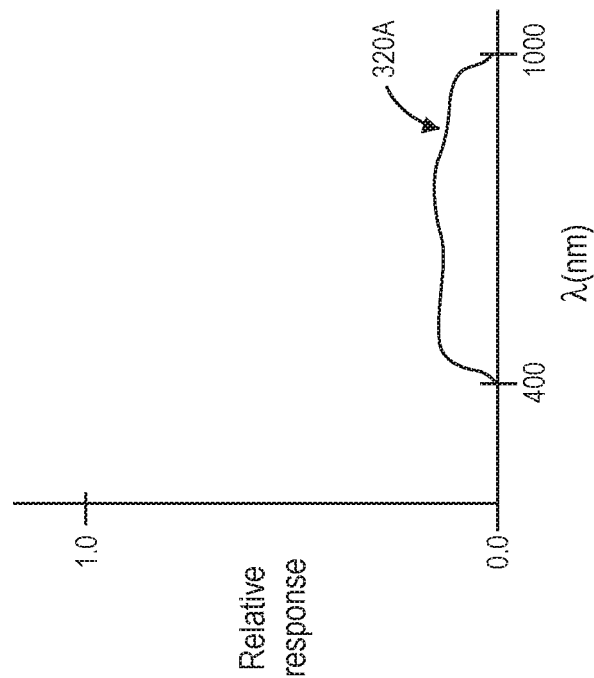
FIG. 3A is a schematic graph of an example spectral response curve of an imaging sensor, in accordance with disclosed implementations.

FIG. 3A is a schematic graphical representation of an example spectral response curve 320A of an imaging sensor, in accordance with disclosed implementations.

As described herein, a spectral response curve of an imaging sensor may comprise a visual or graphical representation of spectral range or spectral sensitivity of the imaging sensor. For example, a spectral response curve may visually or graphically present an absolute light detection response or a relative (or normalized) light detection response per light energy of an imaging sensor with respect to different wavelengths of light.

FIG. 3A graphically presents a spectral response curve 320A of an example imaging sensor, in which a wavelength of light (λ) in nm (nanometers) is represented on the x-axis, and a relative response per light energy (normalized to values between 0.0 and 1.0) is represented on the y-axis. In example embodiments, the spectral response curve 320A of FIG. 3A may represent the spectral response of an example, calibrated imaging sensor having nominal spectral characteristics associated with known environment properties and known light properties, e.g., a low light environment. As shown in FIG. 3A, the relative response per light energy for the example imaging sensor comprises a substantially continuous light detection response over a spectral range of wavelengths between approximately 400 nm and approximately 1000 nm.

Further, a spectral response curve of an uncalibrated imaging sensor of the same type as the example, calibrated imaging sensor represented by the spectral response curve 320A of FIG. 3A may include one or more differences in relative response per light energy at one or more different wavelengths of light. Then, for example, based on such measured or detected differences, the uncalibrated imaging sensor may be calibrated to exhibit the nominal spectral characteristics of the example, calibrated imaging sensor associated with the known environment properties and known light properties.

Figure 3B:
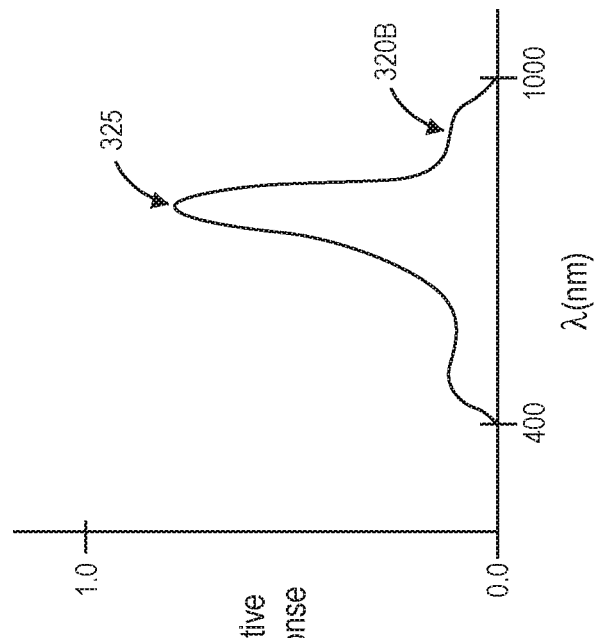
FIG. 3B is a schematic graph of an example spectral response curve of an imaging sensor responsive to injection of emissive particles, in accordance with disclosed implementations.

FIG. 3B is a schematic graphical representation of an example spectral response curve 320B of an imaging sensor responsive to injection or presence of emissive particles, in accordance with disclosed implementations.

FIG. 3B graphically presents a spectral response curve 320B of an example imaging sensor, similar to the example imaging sensor associated with the spectral response curve 320A of FIG. 3A, in which a wavelength of light (λ) in nm (nanometers) is represented on the x-axis, and a relative response per light energy (normalized to values between 0.0 and 1.0) is represented on the y-axis. In example embodiments, the spectral response curve 320B of FIG. 3B may represent the spectral response of an example, calibrated imaging sensor having nominal spectral characteristics associated with known environment properties and known light properties, and also in an environment including one or more types of particles at desired concentrations, e.g., known particle properties. As shown in FIG. 3B, the relative response per light energy for the example imaging sensor comprises a discontinuous light detection response over a spectral range, including one or more spectral bands, of wavelengths between approximately 400 nm and approximately 1000 nm.

In example embodiments, the particles and desired concentrations of such particles that may cause changes to the spectral response curve 320B to include discontinuity 325 may include particles that are configured to emit one or more wavelengths of light, e.g., by injecting particles that have been excited by various methods, such as electric discharge, application of heat, application of laser light, or other electromagnetic excitation. For example, the particles, or electrons associated with the particles, may emit particular wavelengths of light, such that the amount of light energy received by the example imaging sensor at the particular wavelengths of light may be increased in a known or expected manner, based on spectral characteristics, concentrations, and excitations of the particles.

As shown in FIG. 3B, a plurality of particles of a first type at a first concentration may emit wavelengths of light corresponding to wavelengths associated with the discontinuity 325. Alternatively, a combination of particles including a first type of particles at a first concentration and a second type of particles at a second concentration may emit different wavelengths of light, e.g., with the first type of particles emitting wavelengths associated with discontinuity 325 and the second type of particles emitting wavelengths also associated with the discontinuity 325 or a second discontinuity (not shown). The various types of particles, desired concentrations, and/or combinations thereof may be selected and excited to emit particular wavelengths of light and cause corresponding changes to the spectral response curves of imaging sensors, in order to measure spectral characteristics of the imaging sensors with respect to various particular wavelengths of light of interest.

Further, a spectral response curve of an uncalibrated imaging sensor of the same type as the example, calibrated imaging sensor represented by the spectral response curve 320B of FIG. 3B may include one or more differences in relative response per light energy at one or more different wavelengths of light, including with respect to one or more wavelengths of light associated with expected discontinuities 325. Then, for example, based on such measured or detected differences, the uncalibrated imaging sensor may be calibrated to exhibit the nominal spectral characteristics of the example, calibrated imaging sensor associated with the known environment properties, known light properties, and known particle properties.

Figure 4:
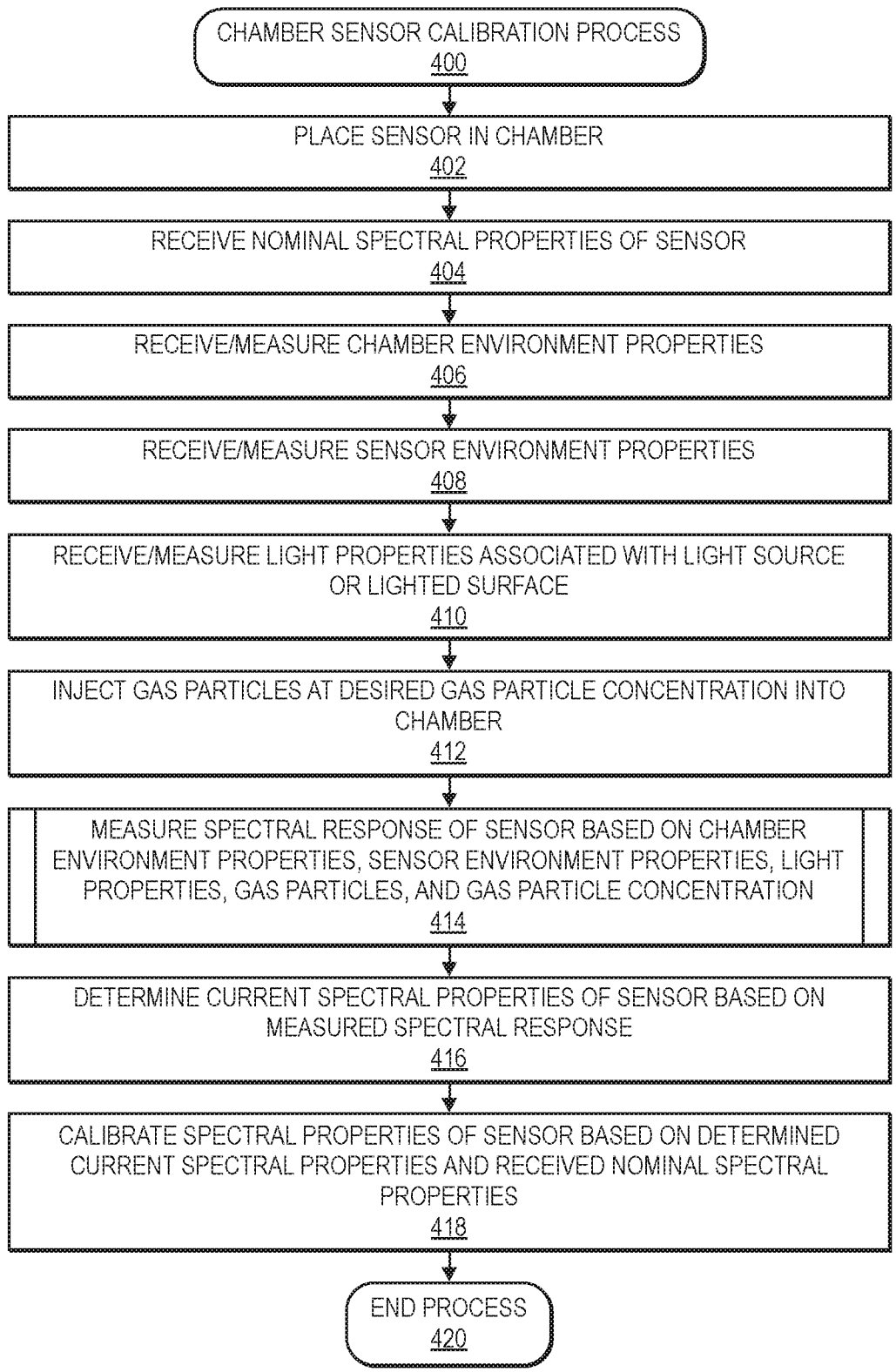
FIG. 4 is a flow diagram illustrating an example chamber sensor calibration process, in accordance with disclosed implementations.

FIG. 4 is a flow diagram illustrating an example chamber sensor calibration process 400, in accordance with disclosed implementations.

The process 400 may begin by placing an imaging sensor in a chamber or enclosure, as at 402. For example, the imaging sensor may be associated with a vehicle, an aerial vehicle, a machine, equipment, or other system or device. In addition, the imaging sensor may be supported, suspended, placed, or otherwise held within the enclosure. Further, the chamber or enclosure may comprise a substantially airtight, closed, and controlled environment, as further described herein.

The process 400 may continue by receiving nominal spectral characteristics of the imaging sensor, as at 404. For example, based on prior measurements, experiments, or evaluations performed with respect to the imaging sensor, or other imaging sensors of the same type, e.g., using the sensor calibration systems and methods described herein, various nominal spectral characteristics of the imaging sensor may have been previously determined or generated and correlated or mapped with various known environment properties, known sensor environment properties, known light properties, and/or known particle properties. The various nominal spectral characteristics may comprise spectral range, spectral sensitivity, spectral response, spectral resolution, and/or other spectral characteristics associated with the imaging sensor.

The process 400 may then proceed by receiving or measuring chamber or enclosure environment properties, as at 406. For example, the enclosure environment properties may comprise pressure, volume, temperature, humidity, airflow, or other properties. Various of the environment properties may affect spectral characteristics of the imaging sensor placed within the enclosure, and the various environment properties may be measured or detected by various suitable sensors, such as barometers, thermometers, hygrometers, airflow sensors, or other types of sensors.

The process 400 may then continue with receiving or measuring sensor environment properties, as at 408. For example, the sensor environment properties may comprise pressure, temperature, humidity, airflow, or other properties. Various of the sensor environment properties may affect spectral characteristics of the imaging sensor placed within the enclosure, and the various sensor environment properties may be measured or detected by various suitable sensors, such as barometers, thermometers, hygrometers, airflow sensors, or other types of sensors.

The process 400 may then proceed with receiving or measuring light properties associated with a light source or lighted surface, as at 410. For example, the light properties may be associated with a light source that directs or emits light toward the imaging sensor, and/or the light properties may be associated with a lighted surface or portion of the chamber or enclosure that is within a field of view of the imaging sensor, e.g., if the light source illuminates the enclosure but does not emit light directly toward the imaging sensor. The light properties may include frequency, wavelength, amplitude, patterns, sequences, or other properties associated with the emitted light. Various of the light properties may affect spectral characteristics of the imaging sensor placed within the enclosure, and the various light properties may be measured or detected by various suitable sensors, such photoelectric sensors, photodetectors, photoresistors, photodiodes, phototransistors, or other types of sensors.

The process 400 may then continue to inject particles, e.g., gas particles, at a desired particle concentration into the chamber or enclosure, as at 412. For example, the particles may be various types of elements, molecules, charged particles, or other materials that are injected at known or desired concentrations into the enclosure. In addition, the particles may be configured to absorb one or more wavelengths of light and/or emit one or more wavelengths of light in known or expected manners. Various types of particles may include various known spectral characteristics at known concentrations, e.g., particle properties, that may affect spectral characteristics of the imaging sensor placed within the enclosure, and the various particle properties may be measured or detected by various suitable sensors, such as particulate sensors, infrared sensors, laser diffraction sensors, air composition sensors, air quality sensors, or other types of sensors.

The process 400 may then proceed to measure the spectral response of the imaging sensor based on the chamber environment properties, the sensor environment properties, the light properties, and the particle properties, as at 414. For example, various spectral characteristics including the spectral range, spectral sensitivity, spectral response, spectral resolution, and/or other spectral characteristics associated with the imaging sensor may be measured or detected by processing imaging data captured by the imaging sensor within the enclosure.

The process 400 may then continue by determining current spectral characteristics of the imaging sensor based on the measured spectral response, as at 416. For example, a current spectral response curve of the imaging sensor may be determined based on processing of imaging data captured by the imaging sensor. In addition, various other spectral characteristics associated with the imaging sensor, such as spectral range, spectral sensitivity, spectral resolution, and/or other spectral characteristics, may be determined based on processing of imaging data captured by the imaging sensor.

Further, based on the nominal spectral characteristics of the imaging sensor associated with the known environment properties, known sensor environment properties, known light properties, and/or known particle properties, one or more differences between the current spectral characteristics of the imaging sensor and the nominal spectral characteristics of the imaging sensor may be determined.

The process may then proceed by calibrating spectral characteristics of the imaging sensor based on the determined current spectral characteristics and received nominal spectral characteristics, as at 418. For example, based on the determined differences between the current spectral characteristics and the nominal spectral characteristics of the imaging sensor, the imaging sensor may be calibrated to exhibit the nominal spectral characteristics.

In further example embodiments, the imaging sensor may be calibrated with any desired spectral characteristics, e.g., which may not correspond to nominal spectral characteristics, based at least in part on the determined differences between the current spectral characteristics and the nominal spectral characteristics, e.g., to exhibit desired spectral characteristics appropriate or suitable for an expected or known operating environment and associated conditions.

In still further example embodiments, based on correlations or mappings between known environment properties, known sensor environment properties, known light properties, known particle properties, and/or nominal spectral characteristics of imaging sensors, various other actions may be performed in addition to or as an alternative to calibrating imaging sensors. For example, based on expected or known operating environments and associated conditions for a system or vehicle comprising a plurality of different types of imaging sensors, one or more types of imaging sensors from among the plurality of different types of imaging sensors may be selected for operation in the expected or known operating environments, e.g., based on correlations or mappings that indicate the selected types of imaging sensors may capture or receive imaging data that is more accurate and/or reliable in such environments. Further, based on measured or processed spectral characteristics of calibrated imaging sensors within an environment, one or more properties associated with the environment, sensor environment, light, and/or particles in the environment may be determined based on the correlations or mappings between known environment properties, known sensor environment properties, known light properties, known particle properties, and/or nominal spectral characteristics of imaging sensors.

Figure 5:
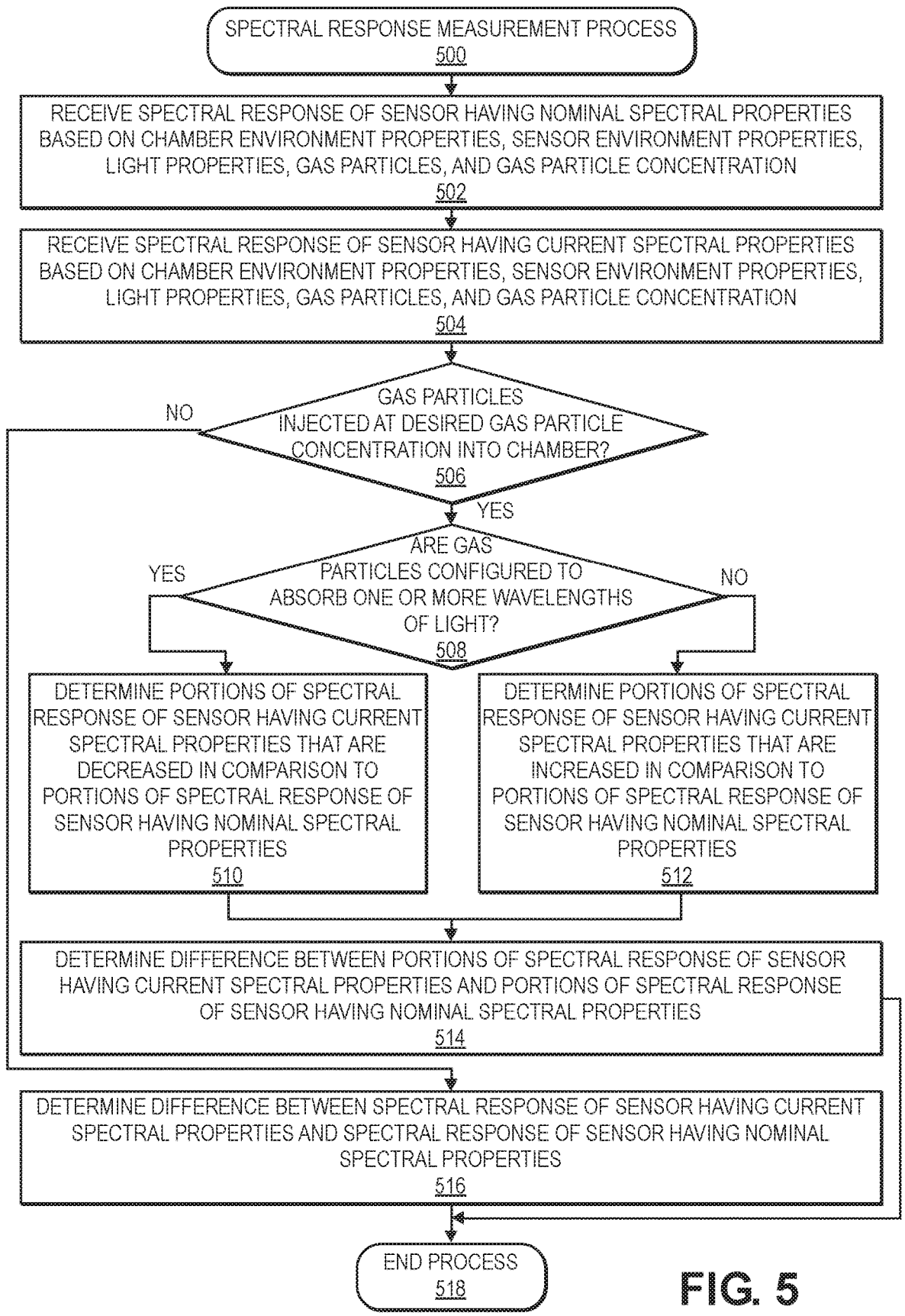
FIG. 5 is a flow diagram illustrating an example spectral response measurement process, in accordance with disclosed implementations.

FIG. 5 is a flow diagram illustrating an example spectral response measurement process 500, in accordance with disclosed implementations. The process 500 may be similar to and provide further details with respect to step 414 described with reference to FIG. 4.

The process 500 may begin by receiving a spectral response of an imaging sensor having nominal spectral characteristics based on chamber environment properties, sensor environment properties, light properties, and particle properties, as at 502. For example, the spectral response may be similar to any of the example spectral response curves shown in FIGS. 2A-3B. In addition to spectral response, various other detected or measured spectral characteristics may be received, such as spectral range, spectral sensitivity, spectral resolution, and/or other spectral characteristics. Further, the various detected or measured spectral characteristics may have been previously measured or detected to generate or determine correlations or mappings between the nominal spectral characteristics of the imaging sensors and various properties associated with the environment, light, and/or particles.

The process 500 may proceed by receiving a spectral response of an imaging sensor having current spectral characteristics based on chamber environment properties, sensor environment properties, light properties, and particle properties, as at 504. For example, the spectral response may also be generally similar to any of the example spectral response curves shown in FIGS. 2A-3B. In addition to spectral response, various other detected or measured spectral characteristics may be received, such as spectral range, spectral sensitivity, spectral resolution, and/or other spectral characteristics.

The process 500 may then continue by determining whether particles, e.g., gas particles, have been injected at a desired particle concentration into a chamber, as at 506. If it is determined that particles have been injected at a desired particle concentration into a chamber, the process 500 may then determine whether the injected particles are configured to absorb one or more wavelengths of light, as at 508.

If it is determined that the injected particles are configured to absorb one or more wavelengths of light, then the process 500 may proceed to determine portions of the spectral response of the imaging sensor having current spectral characteristics that are decreased in comparison with portions of the spectral response of the imaging sensor having nominal spectral characteristics, as at 510. For example, as described at least with respect to FIG. 2B, one or more discontinuities may be determined at portions of the spectral response that are associated with wavelengths of light that have been absorbed by the injected particles.

If, however, it is determined that the injected particles are not configured to absorb one or more wavelengths of light, then the process 500 may proceed to determine portions of the spectral response of the imaging sensor having current spectral characteristics that are increased in comparison with portions of the spectral response of the imaging sensor having nominal spectral characteristics, as at 512. For example, as described at least with respect to FIG. 3B, one or more discontinuities may be determined at portions of the spectral response that are associated with wavelengths of light that have been emitted by the injected particles.

Then, following steps 510 and 512, the process 500 may continue to determine one or more differences between portions of the spectral response of the imaging sensor having current spectral characteristics and portions of the spectral response of the imaging sensor having nominal spectral characteristics, as at 514. For example, at least with respect to discontinuities in the spectral responses cause by absorption and/or emission of wavelengths of light by injected particles, differences between expected changes to the spectral response for an imaging sensor having nominal spectral characteristics and detected changes to the spectral response for an imaging sensor having current spectral characteristics may be determined. The process 500 may then end, as at 518, or alternatively, the process 500 may proceed to step 516, as described below.

Referring back to step 506, if it is determined that particles have not been injected at a desired concentration into a chamber, then the process 500 may proceed to determine one or more differences between the spectral response of the imaging sensor having current spectral characteristics and the spectral response of the imaging sensor having nominal spectral characteristics, as at 516. For example, differences between the expected spectral response for an imaging sensor having nominal spectral characteristics and a detected or measured spectral response for an imaging sensor having current spectral characteristics may be determined. The process 500 may then end, as at 518.

As described above, based on the determined differences between expected and current, measured or detected spectral responses, or other spectral characteristics, of an imaging sensor, the imaging sensor may be calibrated. The calibration may comprise calibrating the imaging sensor to exhibit nominal spectral characteristics, and/or the calibration may comprise calibrating the imaging sensor to exhibit desired, e.g., off-nominal, spectral characteristics that may be suitable or desirable for an expected or known operating environment and associated conditions.

Figure 6:
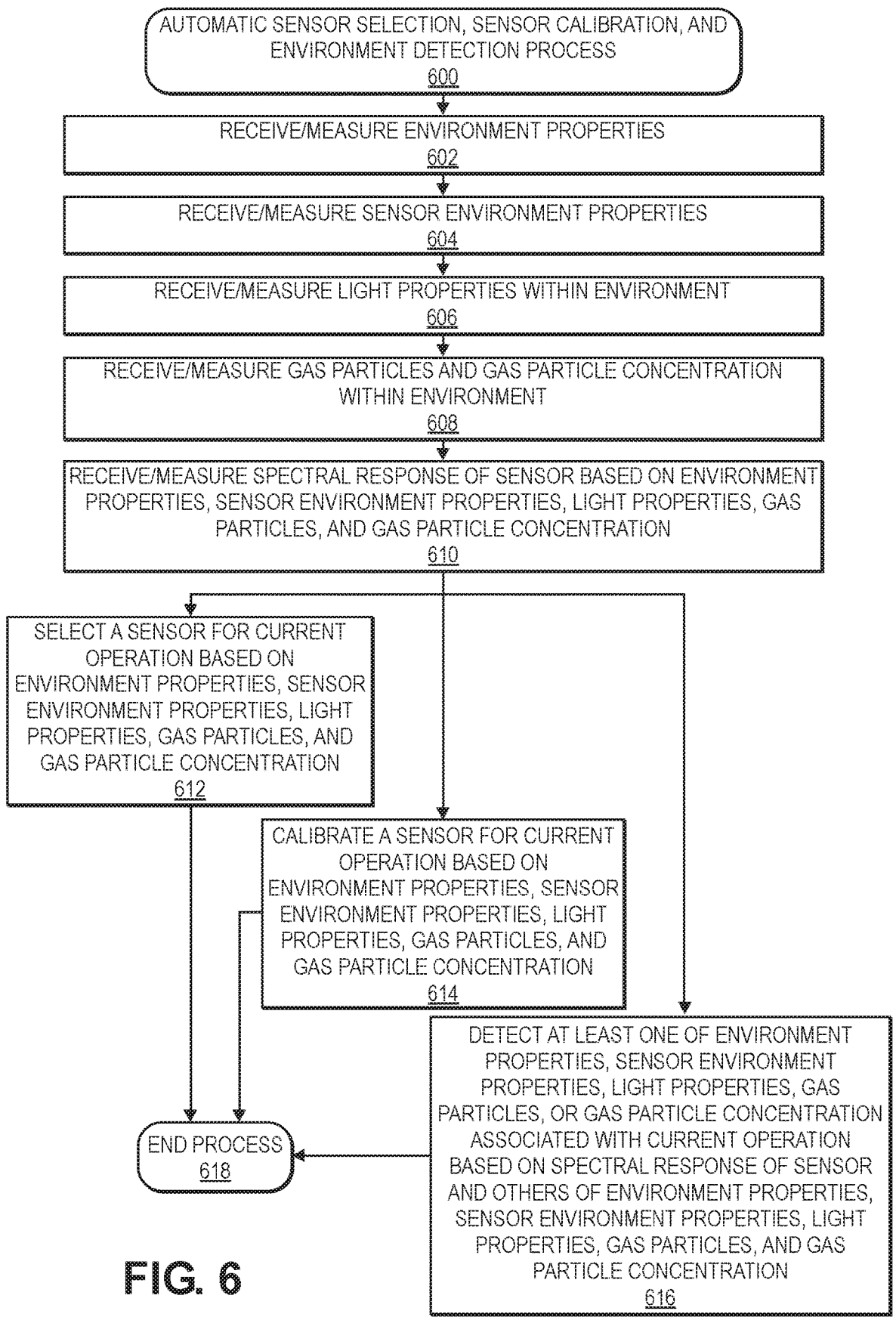
FIG. 6 is a flow diagram illustrating an example automatic sensor selection, sensor calibration, and environment detection process, in accordance with disclosed implementations.

FIG. 6 is a flow diagram illustrating an example automatic sensor selection, sensor calibration, and environment detection process 600, in accordance with disclosed implementations.

The process 600 may begin by receiving or measuring environment properties, as at 602. As described herein, the environment properties may comprise pressure, volume, temperature, humidity, airflow, or other properties. Various of the environment properties may affect spectral characteristics of an imaging sensor, and the various environment properties may be measured or detected by various suitable sensors, such as barometers, thermometers, hygrometers, airflow sensors, or other types of sensors.

The process 600 may then continue with receiving or measuring sensor environment properties, as at 604. For example, the sensor environment properties may comprise pressure, temperature, humidity, airflow, or other properties. Various of the sensor environment properties may affect spectral characteristics of an imaging sensor, and the various sensor environment properties may be measured or detected by various suitable sensors, such as barometers, thermometers, hygrometers, airflow sensors, or other types of sensors.

The process 600 may then proceed with receiving or measuring light properties associated with the environment, as at 606. For example, the light properties may be associated with a light source that directs or emits light toward the imaging sensor, and/or the light properties may be associated with a lighted surface that is within a field of view of the imaging sensor. The light properties may include frequency, wavelength, amplitude, patterns, sequences, or other properties associated with the emitted light. Various of the light properties may affect spectral characteristics of an imaging sensor, and the various light properties may be measured or detected by various suitable sensors, such photoelectric sensors, photodetectors, photoresistors, photodiodes, phototransistors, or other types of sensors.

The process 600 may then continue to receive or measure particles and particle concentrations associated with the environment, as at 608. For example, the particles may be various types of elements, molecules, charged particles, or other materials that are present or provided at known or desired concentrations. In addition, the particles may be configured to absorb one or more wavelengths of light and/or emit one or more wavelengths of light in known or expected manners. Various types of particles may include various known spectral characteristics at known concentrations, e.g., particle properties, that may affect spectral characteristics of an imaging sensor, and the various particle properties may be measured or detected by various suitable sensors, such as particulate sensors, infrared sensors, laser diffraction sensors, air composition sensors, air quality sensors, or other types of sensors.

The process 600 may then proceed to receive or measure a spectral response of an imaging sensor based on the environment properties, sensor environment properties, light properties, and particle properties, as at 610. In example embodiments, a current spectral response, or other current spectral characteristics, of an uncalibrated imaging sensor may be determined based on processing of imaging data captured by the imaging sensor. In other example embodiments, a nominal spectral response, or other nominal spectral characteristics, of a known, calibrated imaging sensor may be determined based on processing of imaging data captured by the imaging sensor. In addition, a nominal spectral response, or other nominal spectral characteristics, of a known, calibrated imaging sensor may be used to generate or determine correlations or mappings of nominal spectral characteristics with various properties associated with an environment, sensor environment, light, and/or particles.

Based on the determined or generated correlations or mappings between nominal spectral characteristics or properties of imaging sensors and various properties associated with an environment, sensor environment, light, and/or particles, various actions may be performed.

In one example embodiment, an imaging sensor may be selected for current operation based on the environment properties, sensor environment properties, light properties, and particle properties, as at 612. For example, a vehicle, machine, equipment, system, or device may comprise a plurality of types of imaging sensors, and based on the generated correlations or mappings, one or more types of imaging sensors may be selected for current operation in a particular environment having associated conditions. In other words, based on the generated correlations or mappings, one or more types of imaging sensors may be determined to provide more accurate and/or reliable data in particular environments having associated conditions, and as a result, the one or more types of imaging sensors may be selected for operation when the vehicles or systems are operating in such known, particular environments having associated conditions.

In another example embodiment, an imaging sensor may be calibrated for current operation based on the environment properties, sensor environment properties, light properties, and particle properties, as at 614. For example, based on the generated correlations or mappings, an imaging sensor associated with a vehicle, machine, equipment, system, or device may be calibrated for current operation in a particular environment having associated conditions. In some examples, the calibration may return the imaging sensor back to nominal spectral characteristics. In other examples, the calibration may involve calibrating the imaging sensor to desired, e.g., potentially off-nominal, spectral characteristics. In other words, based on the generated correlations or mappings, one or more desired, or off-nominal, calibrations of an imaging sensor may be determined to provide more accurate and/or reliable data in particular environments having associated conditions, and as a result, the imaging sensor may be calibrated for operation to such desired spectral characteristics when the vehicles or systems are operating in such known, particular environments having associated conditions. In further examples, in addition to or alternatively to calibrating an imaging sensor to desired spectral characteristics, imaging data captured by an imaging sensor may be adjusted, shifted, or modified based on the generated correlations or mappings, e.g., such that the imaging data captured by an imaging sensor having a current calibration, whether off-nominal or otherwise, may be modified to simulate imaging data that may be captured by an imaging sensor having a desired calibration, whether nominal or otherwise.

In still further examples, the generated correlations or mappings between nominal spectral properties of imaging sensors and various properties associated with an environment, sensor environment, light, and/or particles may be detected, measured, and/or stored over time in order to process, analyze, and determine changes, shifts, or degradations to spectral characteristics of imaging sensors over time, as well as based on usage and operation parameters. Then, based on such generated correlations or mappings over time, current spectral characteristics of imaging sensors at various points of their usage or operation may be predicted or expected, and calibrations of current spectral characteristics of such imaging sensors may further be performed based on their known usage or operation and corresponding expected shifts or degradations to associated spectral characteristics over time.

In a further example embodiment, at least one of environment properties, sensor environment properties, light properties, and/or particle properties associated with current operation may be detected based on a nominal spectral response, or other nominal spectral characteristics, of an imaging sensor, and various other known properties associated with the environment, sensor environment, light, and/or particles, as at 616. For example, based on the generated correlations or mappings, at least one property associated with the environment, sensor environment, light, and/or particles may be detected or determined based on various other known information and properties associated with current operation, such as spectral characteristics of a known, calibrated imaging sensor and others of the properties associated with the environment, sensor environment, light, and/or particles. In other words, based on the generated correlations or mappings, one or more properties associated with the environment, sensor environment, light, and/or particles may be determined based on spectral characteristics of a known, calibrated imaging sensor and other known conditions associated with current operation in a particular environment. Further, various properties associated with environments, light, and/or particles in relatively uncontrolled environments, e.g., fields, parks, outdoor locations, different altitudes, and/or other open or uncontrolled environments, may be detected, measured, and/or stored in association with their respective locations to generate mappings or correlations between particular locations and environments having associated conditions.

In further example embodiments, two or more of the steps 612, 614, 616 may be performed substantially concurrently or in sequence based on the generated correlations or mappings between nominal spectral properties of imaging sensors and various properties associated with an environment, sensor environment, light, and/or particles. The process may then end, as at 618.

Furthermore, although the discussion herein generally relates to experimentation, processing, or evaluation of spectral characteristics of imaging sensors within chambers or enclosures, in other example embodiments, the functions, operations, or processes described herein may be utilized in other environments that are substantially open or accessible, rather than substantially airtight or closed. For example, various types of sensors as described herein may be associated with a location and configured to measure environment properties, sensor environment properties, light properties, and/or particle properties proximate the location, and based on such measured or detected properties associated with the environment, light, and particles proximate the location, imaging sensors associated with vehicles or systems proximate the location may be calibrated in similar manner as described herein with respect to chambers or enclosures. When a vehicle or system is proximate the location, an imaging sensor associated with the vehicle or system may capture imaging data proximate the location, based on which current spectral characteristics of the imaging sensor may be determined. Then, for example, based on known correlations or mappings between properties associated with the environment, light, and particles proximate the location, and nominal spectral characteristics of the imaging sensor, the imaging sensor may be calibrated based on differences between current spectral characteristics and nominal spectral characteristics of the imaging sensor.

In this manner, the generated or determined correlations or mappings between properties associated with the environment, light, and particles, and nominal spectral characteristics of various types of imaging sensors may be utilized in real-time and/or during operations of vehicles, machines, equipment, systems, or devices in various types of environments having associated conditions, without need to perform specific and dedicated calibration or testing of such vehicles or systems within closed and controlled environments. Thus, the locations at which imaging sensors may be calibrated based on the generated or determined correlations or mappings described herein may include various types of locations, including portions of buildings, facilities, warehouses, or other indoor locations, portions of parks, fields, rooftops, or other outdoor locations, and/or various other types of locations at which various properties associated with the environment, light, and particles may be detected, measured, and/or processed, in combination with capture and processing of imaging data from imaging sensors to measure, determine, and/or calibrate spectral characteristics of imaging sensors.

Figure 7:
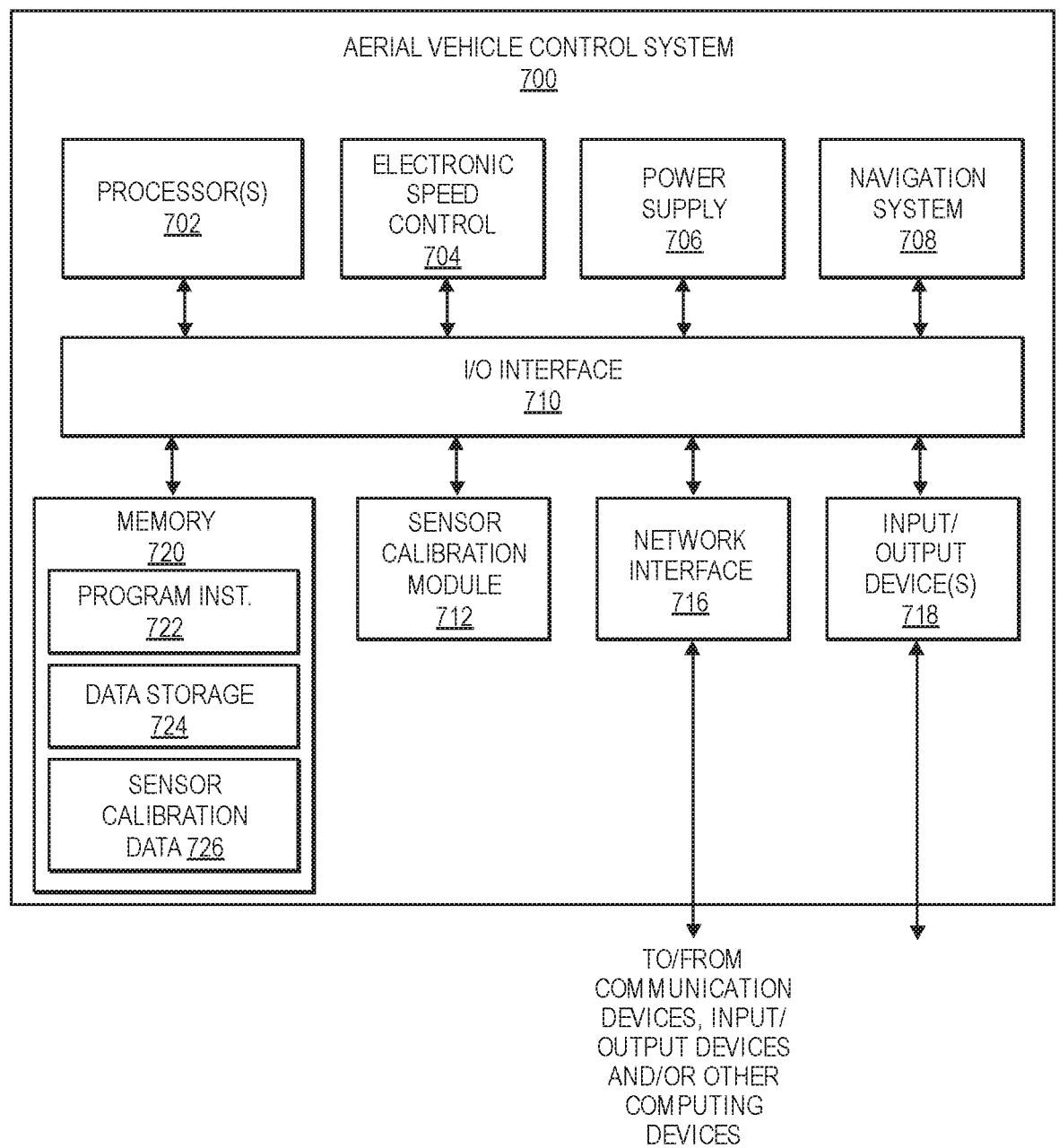
FIG. 7 is a block diagram illustrating various components of an aerial vehicle control system, in accordance with disclosed implementations.

FIG. 7 is a block diagram illustrating various components of an example aerial vehicle control system 700, in accordance with disclosed implementations.

In various examples, the block diagram may be illustrative of one or more aspects of the aerial vehicle control system 700 that may be used to implement the various systems and processes discussed above. Although described with reference to an aerial vehicle, all or portions of the components described herein may form a control system or controller 800, as further described with respect to FIG. 8, for any other vehicle, system, machine, equipment, apparatus, system, or device with respect to which the various systems and corresponding methods described herein may be implemented.

In the illustrated implementation, the aerial vehicle control system 700 includes one or more processors 702, coupled to a non-transitory computer readable storage medium 720 via an input/output (I/O) interface 710. The aerial vehicle control system 700 may also include an electronic speed controller 704, a power supply or battery 706, and/or a navigation system 708. The aerial vehicle control system 700 may further include a sensor calibration module 712, a network interface 716, and one or more input/output devices 718.

In various implementations, the aerial vehicle control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, and sensor calibration data and/or characteristics, including environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and sensor calibration data 726, respectively. In other implementations, program instructions, data and/or sensor calibration data may be received, sent or stored upon different types of computer-accessible media, such as non-transitory media, or on similar media separate from the non-transitory computer readable storage medium 720 or the aerial vehicle control system 700.

Generally, a non-transitory, computer readable storage medium may include storage media or memory media such as magnetic or optical media, e.g., disk or CD/DVD-ROM, coupled to the aerial vehicle control system 700 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The electronic speed control 704 communicates with the navigation system 708 and adjusts the operational characteristics of each propulsion mechanism to guide the aerial vehicle along a determined path and/or to perform other navigational maneuvers. The navigation system 708 may include a GPS or other similar system than can be used to navigate the aerial vehicle to and/or from a location.

The aerial vehicle control system 700 may also include a sensor calibration module 712 that communicates with the processor(s) 702, the non-transitory computer readable storage medium 720, one or more imaging sensors, and/or other components or systems described herein to detect, measure, and/or process various properties associated with environments, light, and/or particles, to detect, measure, and/or process spectral characteristics of imaging sensors, and to calibrate, or perform other actions, functions, operations, or processes described herein, based at least in part on generated correlations or mappings between various properties associated with environments, light, and/or particles and spectral characteristics of imaging sensors.

The network interface 716 may be configured to allow data to be exchanged between the aerial vehicle control system 700, other devices attached to a network, such as other computer systems, imaging sensors, and/or control systems of other vehicles, systems, machines, equipment, apparatuses, systems, or devices. For example, the network interface 716 may enable wireless communication between numerous aerial vehicles. In various implementations, the network interface 716 may support communication via wireless general data networks, such as a Wi-Fi network. For example, the network interface 716 may support communication via telecommunications networks such as cellular communication networks, satellite networks, and the like.

Input/output devices 718 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 718 may be present and controlled by the aerial vehicle control system 700. One or more of these sensors may be utilized to assist in performing the various functions, operations, and processes described herein.

As shown in FIG. 7, the memory may include program instructions 722 which may be configured to implement the example processes and/or sub-processes described above. The data storage 724 may include various data stores for maintaining data items that may be provided for performing the various functions, operations, and processes described herein. For example, the sensor calibration data 726 and/or the data storage 724 may include environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items.

Figure 8:
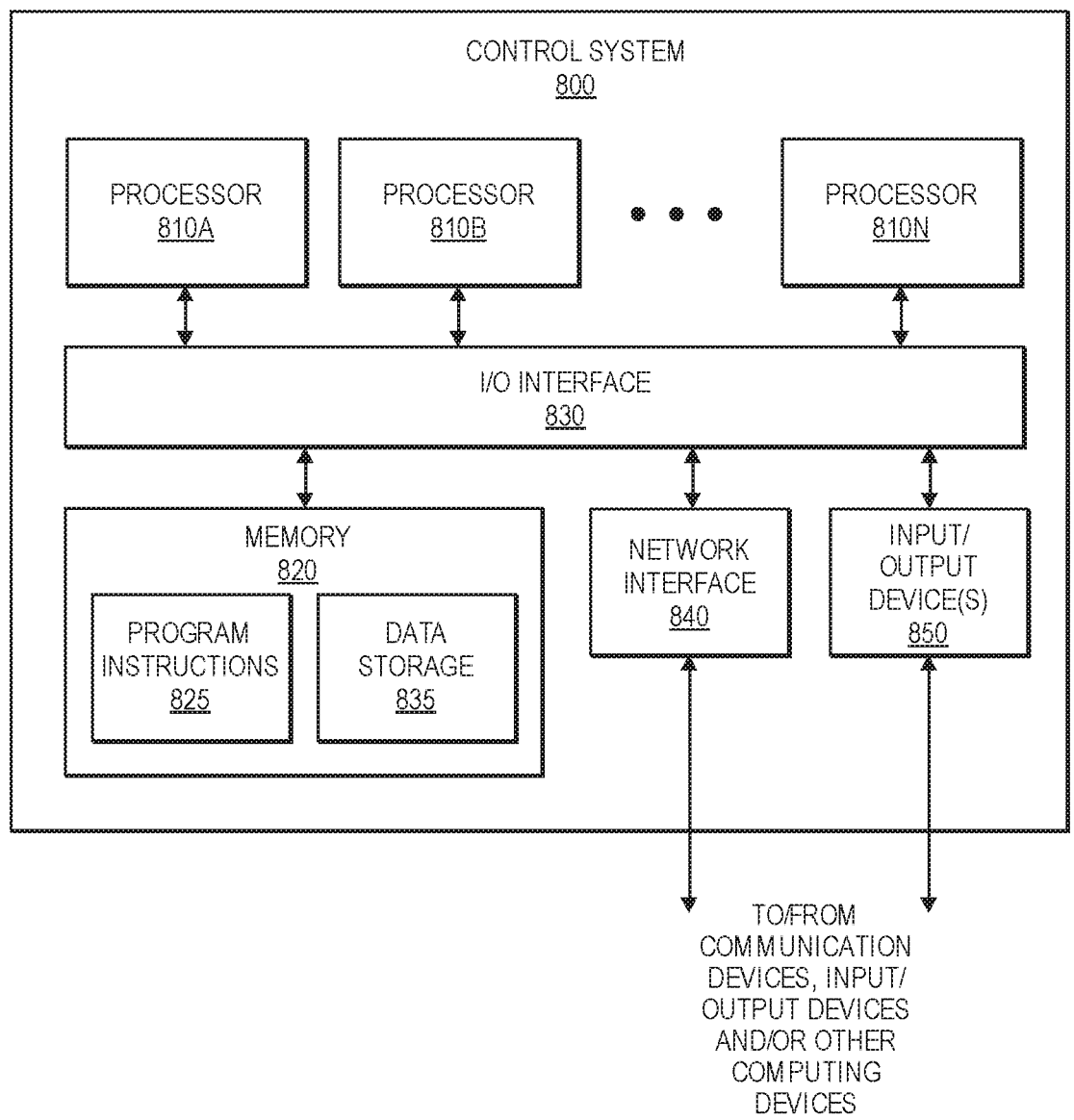
FIG. 8 is a block diagram illustrating various components of a control system, in accordance with disclosed implementations.

FIG. 8 is a block diagram illustrating various components of an example control system 800, in accordance with disclosed implementations.

Various operations of a control system, such as those described herein, may be executed on one or more computer systems, and/or interacting with various other computers, systems, or devices associated with a facility, warehouse, or building, according to various implementations. For example, the control system discussed herein may function and operate on one or more computer systems, including at least partially on an aerial vehicle control system 700, as described with respect to FIG. 7. One such control system is illustrated by the block diagram in FIG. 8. In the illustrated implementation, a control system 800 includes one or more processors 810A, 810B through 810N, coupled to a non-transitory computer-readable storage medium 820 via an input/output (I/O) interface 830. The control system 800 further includes a network interface 840 coupled to the I/O interface 830, and one or more input/output devices 850. In some implementations, it is contemplated that a described implementation may be implemented using a single instance of the control system 800 while, in other implementations, multiple such systems or multiple nodes making up the control system 800 may be configured to host different portions or instances of the described implementations. For example, in one implementation, some data sources or services may be implemented via one or more nodes of the control system 800 that are distinct from those nodes implementing other data sources or services.

In various implementations, the control system 800 may be a uniprocessor system including one processor 810A, or a multiprocessor system including several processors 810A-810N (e.g., two, four, eight, or another suitable number). The processors 810A-810N may be any suitable processor capable of executing instructions. For example, in various implementations, the processors 810A-810N may be general-purpose or embedded processors implementing any of a variety of instruction set architectures (ISAs), such as the x86, PowerPC, SPARC, or MIPS ISAs, or any other suitable ISA. In multiprocessor systems, each of the processors 810A-810N may commonly, but not necessarily, implement the same ISA.

The non-transitory computer-readable storage medium 820 may be configured to store executable instructions and/or data accessible by the one or more processors 810A-810N. In various implementations, the non-transitory computer-readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 820 as program instructions 825 and data storage 835, respectively. In other implementations, program instructions and/or data may be received, sent or stored upon different types of computer-accessible media, such as non-transitory media, or on similar media separate from the non-transitory computer-readable storage medium 820 or the control system 800. Generally speaking, a non-transitory, computer-readable storage medium may include storage media or memory media such as magnetic or optical media, e.g., disk or CD/DVD-ROM, coupled to the control system 800 via the I/O interface 830. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processors 810A-810N, the non-transitory computer-readable storage medium 820, and any peripheral devices, including the network interface 840 or other peripheral interfaces, such as input/output devices 850. In some implementations, the I/O interface 830 may perform any necessary protocol, timing or other data transformations to convert data signals from one component (e.g., non-transitory computer-readable storage medium 820) into a format suitable for use by another component (e.g., processors 810A-810N). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer-readable storage medium 820, may be incorporated directly into the processors 810A-810N.

The network interface 840 may be configured to allow data to be exchanged between the control system 800 and other devices attached to a network, such as other control systems, aerial vehicle control systems, computer systems, other systems or equipment, or between nodes of the control system 800. In various implementations, the network interface 840 may support communication via wired or wireless general data networks, such as any suitable type of Ethernet network.

Input/output devices 850 may, in some implementations, include one or more displays, projection devices, audio input/output devices, keyboards, keypads, touchpads, scanning devices, imaging devices, proximity sensors, voice or optical recognition devices, various other sensors described herein, or any other devices suitable for entering or retrieving data by one or more control systems 800. Multiple input/output devices 850 may be present in the control system 800 or may be distributed on various nodes of the control system 800. In some implementations, similar input/output devices may be separate from the control system 800 and may interact with one or more nodes of the control system 800 through a wired or wireless connection, such as over the network interface 840.

As shown in FIG. 8, the memory 820 may include program instructions 825 that may be configured to implement one or more of the described implementations and/or provide data storage 835, which may comprise various tables, data stores and/or other data structures accessible by the program instructions 825. The program instructions 825 may include various executable instructions, programs, or applications to facilitate performing the various functions, operations, or processes described herein. The data storage 835 may include various data stores for maintaining data related to environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items.

Those skilled in the art will appreciate that the control system 800 is merely illustrative and is not intended to limit the scope of implementations. In particular, the control system and devices may include any combination of hardware or software that can perform the indicated functions, including computers, network devices, internet appliances, robotic devices, etc. The control system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must).

Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to calibrate spectral characteristics of an imaging sensor, comprising:
    a test chamber enclosing an environment;
    an aerial vehicle configured to be placed within the test chamber, the aerial vehicle including an imaging sensor;
    a light source configured to emit light toward the imaging sensor of the aerial vehicle;
    a particle source configured to inject particles at a concentration into the test chamber; and
    a control system configured to at least:
        determine environment properties associated with the environment enclosed within the test chamber;
        determine imaging sensor environment properties associated with the imaging sensor of the aerial vehicle placed within the test chamber;
        receive data associated with the particles and the concentration of particles injected into the test chamber;
        receive data associated with the light emitted toward the imaging sensor of the aerial vehicle;
        determine nominal spectral characteristics associated with the imaging sensor based at least in part on the environment properties, the imaging sensor environment properties, the data associated with the particles and the concentration of particles, and the data associated with the light;
        receive imaging data captured by the imaging sensor of the aerial vehicle within the test chamber;
        process the imaging data captured by the imaging sensor to determine current spectral characteristics associated with the imaging sensor;
        determine a difference between the nominal spectral characteristics and the current spectral characteristics associated with the imaging sensor; and
        calibrate the imaging sensor of the aerial vehicle based at least in part on the difference between the nominal spectral characteristics and the current spectral characteristics.

2. The system of claim 1, wherein the environment is a substantially airtight, closed environment enclosed within the test chamber.

3. The system of claim 1, wherein the environment properties comprise at least one of pressure, volume, temperature, humidity, or airflow; and
    wherein the imaging sensor environment properties comprise at least one of pressure, temperature, humidity, or airflow.

4. The system of claim 1, wherein the data associated with the particles comprises at least one of type, charge, element, molecule, or material.

5. The system of claim 1, wherein the data associated with the light comprises at least one of frequency, wavelength, or amplitude.

6. A method, comprising:
    receiving, by a processor, imaging data captured by an imaging sensor;
    processing, by the processor, the imaging data captured by the imaging sensor to determine current spectral characteristics associated with the imaging sensor based at least in part on environment properties, light properties, and particle properties associated with capture of the imaging data;
    comparing, by the processor, the current spectral characteristics associated with the imaging sensor with nominal spectral characteristics associated with the imaging sensor to determine a difference, the nominal spectral characteristics based at least in part on the environment properties, the light properties, and the particle properties; and
    calibrating, by the processor, the imaging sensor based at least in part on the difference between the nominal spectral characteristics and the current spectral characteristics.

7. The method of claim 6, wherein the environment properties comprise at least one of properties associated with an environment around the imaging sensor, or properties associated with a sensor environment proximate the imaging sensor; and
    wherein the environment properties are detected by at least one of a barometer, a thermometer, a hygrometer, or an airflow sensor.

8. The method of claim 6, wherein the particle properties comprise at least one of a type or a concentration of particles proximate the imaging sensor; and
    wherein the particle properties are detected by at least one of a particulate sensor, an infrared sensor, a laser diffraction sensor, an air composition sensor, or an air quality sensor.

9. The method of claim 6, wherein the light properties comprise at least one of frequency, wavelength, or amplitude of light associated with capture of the imaging data; and
    wherein the light properties are detected by at least one of a photoelectric sensor, a photodetector, a photoresistor, a photodiode, or a phototransistor.

10. The method of claim 8, wherein the particles are configured to absorb one or more wavelengths of light;
    wherein processing the imaging data to determine the current spectral characteristics further comprises:
        determining current absorption by the particles of the one or more wavelengths of light; and
    wherein comparing the current spectral characteristics with the nominal spectral characteristics to determine the difference further comprises:
        comparing the current absorption by the particles of the one or more wavelengths of light with nominal absorption by the particles of the one or more wavelengths of light to determine the difference.

11. The method of claim 8, wherein the particles are configured to emit one or more wavelengths of light;
   wherein processing the imaging data to determine the current spectral characteristics further comprises:
      determining current emission by the particles of the one or more wavelengths of light; and
   wherein comparing the current spectral characteristics with the nominal spectral characteristics to determine the difference further comprises:
      comparing the current emission by the particles of the one or more wavelengths of light with nominal emission by the particles of the one or more wavelengths of light to determine the difference.

12. The method of claim 6, wherein calibrating the imaging sensor based at least in part on the difference between the nominal spectral characteristics and the current spectral characteristics further comprises:
   calibrating the imaging sensor from the current spectral characteristics to the nominal spectral characteristics.

13. The method of claim 6, wherein calibrating the imaging sensor based at least in part on the difference between the nominal spectral characteristics and the current spectral characteristics further comprises:
   calibrating the imaging sensor from the current spectral characteristics to desired spectral characteristics based at least in part on the nominal spectral characteristics.

14. The method of claim 6, wherein calibrating the imaging sensor based at least in part on the difference between the nominal spectral characteristics and the current spectral characteristics further comprises:
   modifying imaging data received from the imaging sensor based at least in part on the difference between the nominal spectral characteristics and the current spectral characteristics.

15. The method of claim 6, further comprising:
   selecting, by the processor, the imaging sensor from a plurality of imaging sensors based at least in part on the environment properties, the light properties, and the particle properties.

16. The method of claim 6, further comprising:
   determining, by the processor, at least one of the environment properties, the light properties, or the particle properties based on the current spectral characteristics associated with the imaging sensor.

17. The method of claim 6, further comprising:
   causing placement, by the processor, of an aerial vehicle including the imaging sensor within a test chamber enclosing an environment having the environment properties, the test chamber including a light source emitting light within the test chamber in accordance with the light properties, and the test chamber including a particle source emitting particles within the test chamber in accordance with the particle properties.

18. A system to detect spectral characteristics of a sensor, comprising:
   a location having associated environment properties, light properties, and particle properties;
   an imaging sensor positioned proximate the location; and
   a control system configured to:
      receive imaging data captured by the imaging sensor positioned proximate the location;
      process the imaging data captured by the imaging sensor to determine current spectral characteristics associated with the imaging sensor based at least in part on the environment properties, the light properties, and the particle properties associated with the location;
      compare the current spectral characteristics associated with the imaging sensor with nominal spectral characteristics associated with the imaging sensor to determine a difference, the nominal spectral characteristics based at least in part on the environment properties, the light properties, and the particle properties; and
      calibrate the imaging sensor based at least in part on the difference between the nominal spectral characteristics and the current spectral characteristics.

19. The system of claim 18, wherein the location comprises at least one of an indoor location or an outdoor location.

20. The system of claim 18, further comprising:
   at least one sensor configured to detect at least one of the environment properties, the light properties, or the particle properties associated with the location.

* * * * *